(12) United States Patent
Fuss et al.

(10) Patent No.: US 6,427,789 B1
(45) Date of Patent: Aug. 6, 2002

(54) ROCK DRILLING TOOL WITH IMPROVED CONVEYING

(75) Inventors: Mathias Fuss, Weingarten; Thomas Wagegg, Kisslegg; Bernhard Moser, Altshausen, all of (DE)

(73) Assignee: Hawera Probst GmbH, Ravenburg (DE)

( * ) Notice: Subject to any disclaimer, the term of this patent is extended or adjusted under 35 U.S.C. 154(b) by 0 days.

(21) Appl. No.: 09/555,841

(22) PCT Filed: Nov. 25, 1998

(86) PCT No.: PCT/DE98/03465

§ 371 (c)(1),
(2), (4) Date: Aug. 8, 2000

(87) PCT Pub. No.: WO99/29998

PCT Pub. Date: Jun. 17, 1999

(30) Foreign Application Priority Data

Dec. 4, 1997 (DE) .......................................... 197 53 731

(51) Int. Cl.[7] .......................... E21B 17/22; E21B 10/44
(52) U.S. Cl. ....................................... 175/323; 175/394
(58) Field of Search .................................. 175/394, 323

(56) References Cited

U.S. PATENT DOCUMENTS

| | | | | | |
|---|---|---|---|---|---|
| 837,490 A | * | 12/1906 | Nelson | ...................... | 175/394 |
| 4,549,616 A | * | 10/1985 | Rumpp et al. | ............... | 175/394 |
| 4,579,180 A | * | 4/1986 | Peetz et al. | .................. | 175/394 |
| 4,883,135 A | * | 11/1989 | Moser et al. | ................ | 175/323 |
| 4,967,855 A | * | 11/1990 | Moser | ......................... | 175/394 |
| 5,487,434 A | * | 1/1996 | Obermeier | ................... | 175/323 |
| 5,503,237 A | * | 4/1996 | Neukirchen | ................. | 175/323 |

FOREIGN PATENT DOCUMENTS

| | | |
|---|---|---|
| DE | 2 013 328 | 7/1971 |
| DE | 23 58 447 | 3/1975 |
| DE | 3014693 | 10/1981 |
| DE | 30 20 948 A1 | 10/1981 |
| DE | 37 40 692 | 4/1989 |
| DE | 43 38 667 | 5/1995 |
| DE | 195 07 487 | 9/1996 |
| FR | 1595690 | 6/1970 |

* cited by examiner

Primary Examiner—Hoang Dang
(74) Attorney, Agent, or Firm—Morgan, Lewis & Bockius LLP

(57) ABSTRACT

The invention proposes a drilling tool, in particular rock-drilling tool for rotary and/or percussive operation, in which, for the purpose of improving the drilling properties, the drilling-dust discharge groove is subdivided into at least two discharge-groove sections, each section having its own drilling-dust-carrying surface.

14 Claims, 2 Drawing Sheets

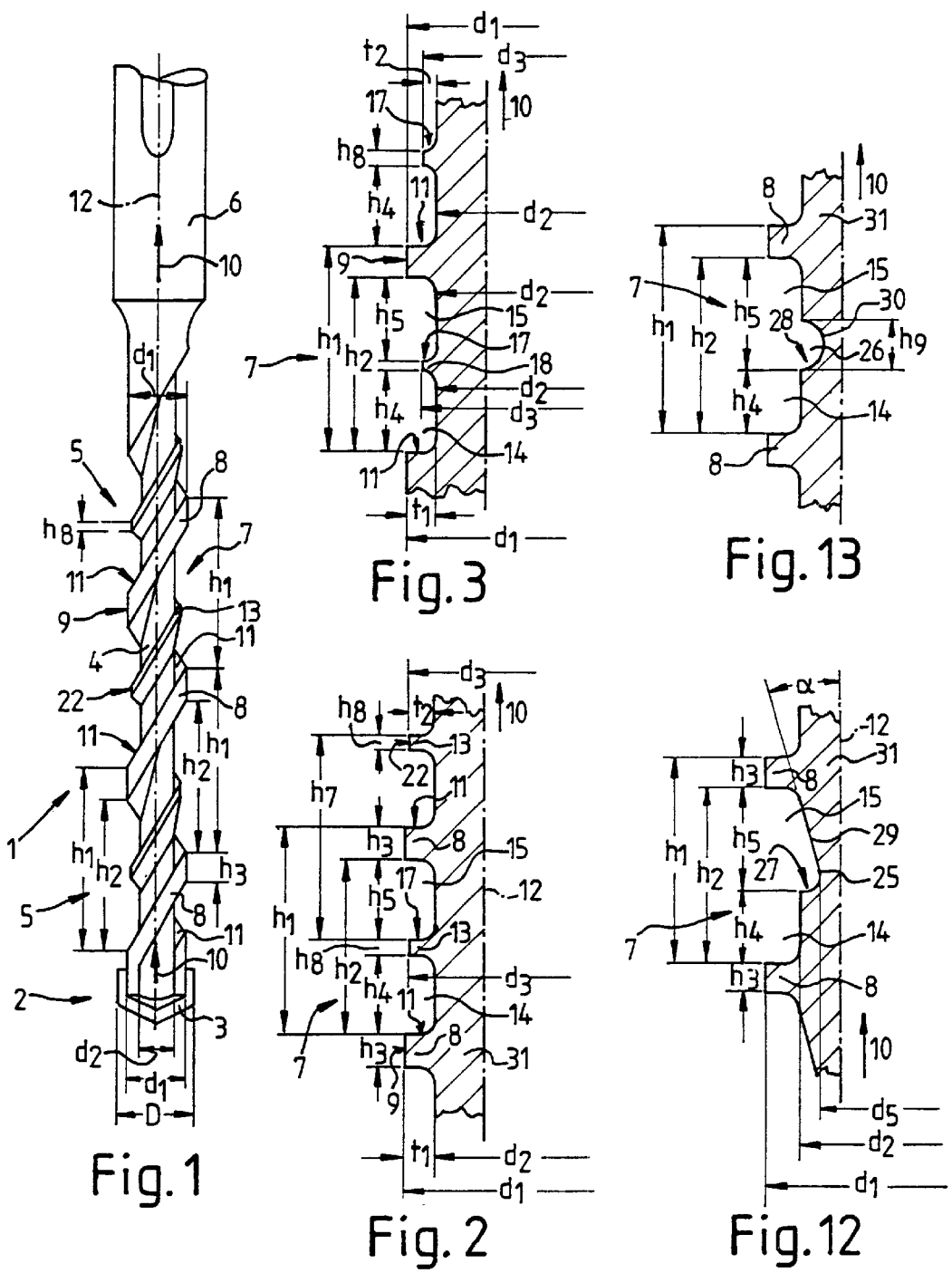

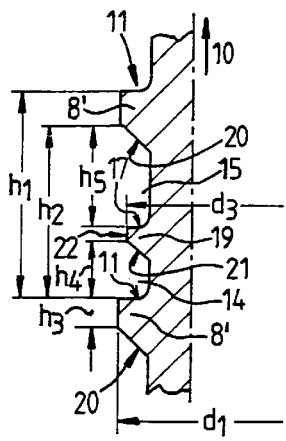
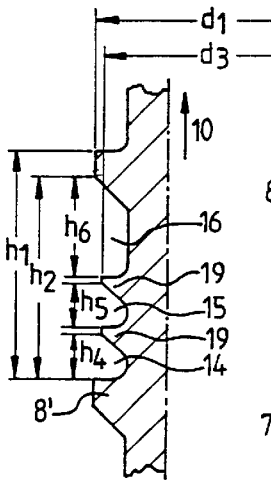
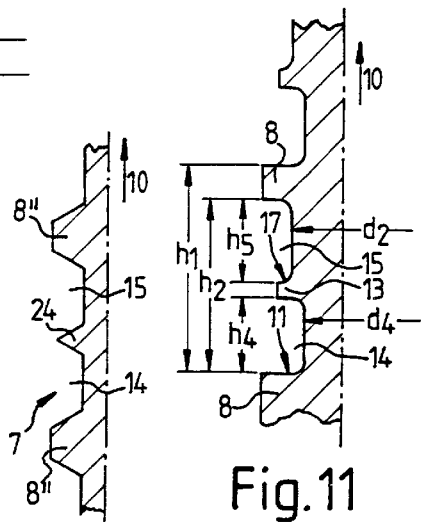
Fig. 5  Fig. 7  Fig. 9  Fig. 11
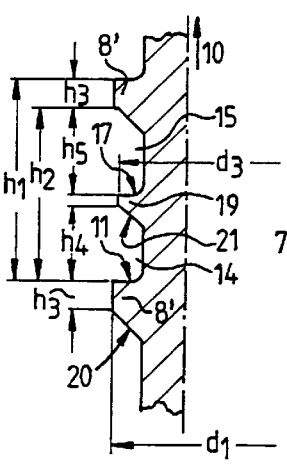
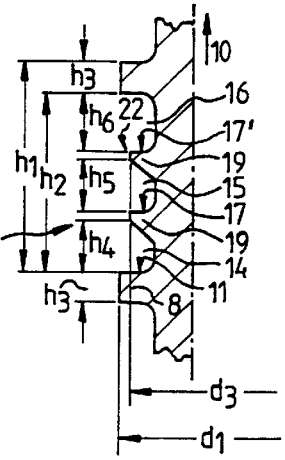
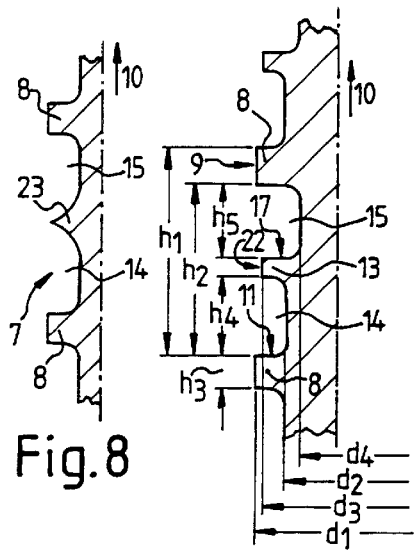
Fig. 4  Fig. 6  Fig. 8  Fig. 10

ROCK DRILLING TOOL WITH IMPROVED CONVEYING

FIELD OF THE INVENTION

The invention relates to a drilling tool, in particular a rock-drilling tool.

BACKGROUND OF THE INVENTION

Rock drills comprise a drill head, usually provided with a carbide cutting plate, a single-start or multi-start, spiral-like conveying helix, which adjoins said drill head, and a following clamping shank for fastening in a drive machine. In rock drills, the main task of the conveying helix is to convey out of the drill hole the material detached by the carbide cutting edge, i.e. the drilling dust or drillings. In this case, the size of the drilling-dust groove, i.e. the free conveying cross section, is critical for the capacity of the drill, i.e. good drilling-dust transportation ensures good advancement and prevents chatter marks in the drill hole and damage to the drill by jamming, overheating or the like. It is also the case that the service lives of a drilling tool are influenced by the good conveying properties of the drilling-dust groove.

Furthermore, the conveying helix also has to satisfy guidance properties of the drilling tool in the drill hole.

The helical discharge groove for drilling dust of a single-start or multi-start conveying helix is bounded on both sides by likewise helically running webs. In this case, the webs form a carrying surface or transporting surface for the drilling dust, said surface being oriented in the transporting direction of the drilling dust i.e. in the direction of the clamping shank. The circumferential surface or lateral surface of a web forms the so-called spine surface, with a certain spine width, of the web. The wider this spine surface, the better are the guidance properties of the drilling tool in the drill hole. The disadvantage here, however, is the increased friction in the drill hole and the reduced groove volume for transporting away the drilling dust. Accordingly, comprises have to be made between width of the spine surface of the webs and the resulting groove volume, on the one hand, and the required guidance properties, on the other hand.

The figures in DE-B 20 13 328 illustrate the basic construction of such a two-start conveying helix.

There are a number of proposals for improving the conveying properties of the drilling dust in the drilling-dust grooves. For example, EP 0 126 409 B2 makes provision for increasing the height of the leads of the conveying helixes in the direction of the clamping end in order thus to make available, in the region of the drill head, an increased number of web surfaces for the purpose of improving the guidance properties. This also increases the drilling-dust groove in the direction of the clamping end, i.e. in the conveying direction of the drilling dust, with the result that jamming of the drill cannot occur.

It is disclosed in DE 30 14 693 C2 that good conveying properties of a conveying helix in accordance with the principle of a conveying worm are only provided when the frictional resistance between the wall of the drill hole and the drillings located in the discharge groove is greater than between the drillings and the surface of the discharge groove. It would be necessary, for this purpose, for the volume of the drilling-dust groove to be constantly adapted to the quantity of drilling dust arising, in order to provide these friction ratios. This is not possible, however, on account of the different quantities of drilling dust arising on account of different drilling conditions. This state of the art thus proposes to increase the drilling-dust groove in sections in the direction of the clamping end.

DE-43 38 667 A1 has disclosed a rock drill in which a reduction in the wall friction is produced in that the spine surfaces of the spiral-like webs have grooves introduced therein. These secondary grooves predominately cause a reduction in the surface area of the web spines and thus reduce the friction. To a certain extent, they may also serve for discharging drillings, although this constitutes merely a secondary effect.

SUMMARY OF THE INVENTION

The object of the invention is to provide a drilling tool which, in relation to conventional drilling tools, has improved conveying properties for the drillings, along with reduced wall friction. In this case, the desired success is to be brought about by design measures which are as straightforward, and thus as cost-effective, as possible.

The invention is based on the finding that good conveying properties of the drilling dust in drilling-dust grooves are also determined not least by the size of the available drilling-dust-carrying surfaces. This size is determined by the number of discharge grooves, each with an associated web with carrying surface, present. A sufficient number or quantity of drilling-dust-carrying surfaces are formed by the flanks of helically running webs, said flanks being arranged essentially perpendicularly to the longitudinal axis of the drill. The design of the drilling tool according to the invention makes provision for providing, in addition to the conventionally provided main webs with corresponding carrying surfaces, conveying elements such as secondary webs or secondary flanks, which, for their part, form additional drilling-dust-carrying surfaces. In this case, the secondary webs may be designed similarly to the main webs. However, their external diameter is basically smaller than the external diameter of the conveying helix, with the result that there is a reduction in the frictional losses, along with improved conveying properties. It is also possible to provide core indents for the purpose of forming additional carrying surfaces or conveying edges for drilling dust.

By virtue of measures according to the invention, it is possible for the discharge groove to be formed as a so-called double groove or multiple groove, with the result that a plurality of individual grooves with associated carrying surfaces for drilling dust are preferably provided within one discharge groove.

This basic finding has led to a large number of possible designs for realizing this basic idea. These possible designs contain a variation in the manner of arranging the secondary webs and/or the secondary carrying surfaces in the form of secondary conveying edges. It is also possible to vary the number of such secondary conveying elements, this also resulting not least in the discharge groove being divided up into discharge sub-grooves of the same size or of different sizes and with groove depths of the same size or of different sizes.

Different embodiments of the basic idea according to the invention are explained in more detail in the following description and are illustrated in the drawing, in which:

BRIEF DESCRIPTION OF THE DRAWINGS

FIG. 1 shows a drilling tool according to the invention in its entirety, and

FIGS. 2–13 show different variants of the drilling tool according to FIG. 1.

DESCRIPTION OF THE PREFERRED EMBODIMENTS

The exemplary embodiment illustrated in FIG. 1 constitutes a first basic principle of the invention. Here, the principle of main-web and secondary-web formation is realized in that individual discharge-groove sections are formed within an existing discharge groove 7, said sections forming additional drilling-dust-carrying surfaces on their own. A variant of this basic principle is illustrated in each of FIGS. 2 to 13.

The rock-drilling tool 1 illustrated in FIG. 1 comprises a drill head 2, preferably with a carbide cutting plate 3 provided on the end side, a helical shank 4, with a spiral conveying helix 5, and an adjoining clamping shank 6 for insertion into a drive machine.

In the exemplary embodiment according to FIG. 1, the spiral-like conveying helix is designed with a single start with a lead height ($h_1$), this resulting in a peripheral, helical discharge groove 7, with the groove height $h_2$, which is bounded on both sides by a likewise helical running web 8. The web height h3 forms the outer circumference or the spine surface 9 of the web 8. The spine surface 9 has the conveying-helix diameter $d_1$. The nominal diameter of the drilling tool is formed by the diameter D of the carbide cutting plate 3. The diameter of the drill core 31 of the conveying helix is designated $d_2$.

The drilling dust or drillings conveyed by way of the drilling-dust groove or discharge groove 7 is/are supported on the carrying surface 11, which is oriented in the conveying direction 10 and has an approximately right-angled profile in relation to the longitudinal axis 12 of the drill.

According to the illustration of FIG. 1 and the enlarged illustration in FIG. 2, a so-called secondary web 13 is located within the discharge groove 7. This secondary web 13 basically constitutes a smaller version of the main web 8. However, it may also vary geometrically. The discharge groove 7 with the height $h_2$ is divided up, by a secondary web 13, into a bottom groove section 14 with the height $h_4$ and a top groove section 15 with the height $h_5$. The height of the secondary web 13 is designated $h_8$. The outer spine surface of the secondary web 13 is designated 22. The external diameter of the outer spine surface 22 is specified by $d_3$.

The additional secondary web in relation to the main web 8 results in an additional carrying surface 17 which likewise runs approximately at right angles to the longitudinal axis 12 of the drill.

In the exemplary embodiment according to FIGS. 1 and 2, the external diameter $d_3$ of the secondary webs is dimensioned to be only slightly smaller than the external diameter $d_1$ of the conveying helix 5. As a result, the discharge groove 7 forms a type of double groove with the groove sections 14, 15 and the main carrying surface 11 and the secondary carrying surface for the drilling dust. Accordingly, the secondary web 13 likewise runs as a spiral-like secondary conveying helix, with the lead height $h_7$, within the discharge groove 7.

According to the exemplary embodiment of FIGS. 1 and 2, the bottom groove section 14 and the top groove section 15, with their height $h_4$ and $h_5$, are designed to give approximately the same size. The same applies to the exemplary embodiment according to FIG. 3. In this case, the same parts are provided with the same designations. In FIG. 3, however, the external diameter $d_3$ of the secondary web 18 there is dimensioned to be considerably smaller, this resulting in merely a relatively small carrying surface 17 for the drilling dust which is to be transported. As in FIG. 2, the division of the groove sections 14, 15 is carried out symmetrically in FIG. 3, i.e. $h_4 \approx h_5$. In the exemplary embodiments according to FIGS. 2 and 3, the diameter ratio $d_3$ to $d_1$ is in the range of approximately 0.7 to 0.95, in order to form a sufficient secondary carrying surface 17. In special cases, it may also be expedient for the same external diameters to be selected here.

FIGS. 5 to 11 specify further variants of the embodiment according to the abovedescribed FIGS. 2 and 3. The same parts are provided with the same designations.

Unlike the exemplary embodiment according to FIG. 2, both the main web 8' and the secondary web 19 are designed in a type of saw-tooth shape in FIGS. 4 and 5, i.e. that region of the respective web which is located opposite the respective carrying surface 11, 17 is designed as a beveled surface 20 for the main web 8' and as a beveled surface 21 for the secondary web 19.

In FIG. 4, the discharge-groove sections 14, 15, once again, are of symmetrical design, i.e. $h_4 \approx h_5$. In FIG. 5, the groove division is arranged asymmetrically. In this case, $h_4 < h_5$, i.e. the discharge-groove section 14 is smaller than the discharge-groove section 15. The diameter $d_3$ of the outer spine surfaces 22 of the secondary webs 19 may be designed analogously to the illustration according to FIGS. 2 and 3. In the illustration according to FIGS. 4 and 5, the diameters $d_3$ are of the same design.

A further variant of the invention is illustrated in FIGS. 6 and 7. Here, the discharge groove 7 is divided up into three sub-sections 14, 15, 16, the respective discharge-groove sections having heights $h_4$, $h_5$ and $h_6$. Analogously to the embodiment according to FIGS. 2 and 3, the main web 8 is of essentially right-angled design and, analogously to the exemplary embodiments according to FIGS. 4 and 5, the secondary webs 19 are designed in the manner of saw teeth.

The variant according to FIG. 7 differs from that according to FIG. 6 in that, once again, the groove sections 14, 15, 16 are divided up asymmetrically, the bottom groove section 14 and the central groove section 15 having approximately the same height $h_4 \approx h_5$, while the groove height $h_6$ of the top groove section 16 is approximately double the size of the heights $h_4$, $h_5$.

Similarly to the case in FIGS. 4 and 5, the webs 8', 9 are also designed in the manner of saw teeth in FIG. 7.

In FIGS. 6 and 7, the external diameters $d_3$ of the outer spine surfaces 22 are dimensioned in relation to the conveying-helix diameter $d_1$ as has been described for FIGS. 2 and 3.

The exemplary embodiment of the invention according to FIG. 8 corresponds to the greatest extent to the exemplary embodiment according to FIG. 2, but with the difference that the secondary web 23 is arcuate and terminates in a point, with otherwise symmetrical arrangement within the discharge groove 7. The main web 8, once again, is of rectangular design, as has been described for FIGS. 2 and 3.

The exemplary embodiment according to FIG. 9 shows a triangular secondary web 24 which, once again, is arranged symmetrically in the discharge groove 7. The main webs 8" are designed trapezoidally in cross section. Otherwise, the discharge-groove sections 14, 15 are arranged symmetrically within the discharge groove 7.

In the illustration of the exemplary embodiments according to FIGS. 2 to 9, the core diameters of all the discharge-groove sections are of approximately the same design. This core diameter is designated $d_2$.

In contrast, the exemplary embodiments according to FIGS. 10 and 11 show groove sections 14, 15 with different core diameters as variants.

In FIG. 10, the bottom groove section 14 is designed with a core diameter $d_2$ and the top groove section 15 is assigned with a core diameter $d_4$, where $d_4<d_2$. By a reduction in the core diameter in top groove section 15, the groove volume can be increased further for the purpose of receiving drilling dust. The secondary carrying surface 17 of the secondary web 13 is also thereby increased. This makes it possible to compensate for the reduced external diameter $d_3$ ($d_3<d_1$).

The reverse is the case in the exemplary embodiment according to FIG. 11. Here, the bottom groove section 14 is provided with a smaller core diameter $d_4$, for the top groove section 15 has the normal core diameter $d_2$.

The exemplary embodiments according to FIGS. 2 to 11 show that there are a large number of possible variations for producing groove sections within a discharge groove 7 of a single-start or multi-start conveying helix by a secondary web 13, 18, 19 being formed in relation to the main web 8, 8', 8". There are different variations for the geometrical design of these secondary webs. It is also possible for the symmetry or asymmetry of the different groove sections within the discharge groove 7 to influence the properties of the discharge groove. Finally, different core diameters of the groove sections may result in groove volumes of different sizes.

A further variation of the invention is provided by the exemplary embodiments according to FIGS. 12 and 13. Here, instead of one or more additional secondary webs in relation to the main web 8, negative webs, as it were, are formed by indents 25, 26. For this purpose, the core cross section of the conveying helix is weakened by a corresponding indent, which then leads to the corresponding carrying surfaces 27, 28.

Accordingly, in the exemplary embodiment according to FIG. 12, a nose-like cutout 29 is introduced into the conveying-helix core, which results in a maximum reduction in the core cross section to the diameter $d_5$. The resulting bevel is at an angle $\alpha\approx15°$ in relation to the longitudinal axis 12 of the drill.

The resulting additional carrying surface 27 divides the discharge groove 7 into a bottom groove section 14 with the height $h_4$ and a top groove section 15 with the height $h_5$, where $h_4<h_5$.

The nose-like cutout 29, with the carrying surface 27, illustrated in FIG. 12 is replaced in the exemplary embodiment according to FIG. 13 by a semicircular cutout 30 with a height $h_9$. The semicircular cutout 30, once again, forms an additional carrying surface 28 for drilling dust. As a result, it is also the case in the exemplary embodiment according to FIG. 13, that the discharge groove 7 is divided up into a bottom groove section 14 and a top groove section 15.

In all of the figures, arrow 10 specifies the transporting direction of the drilling dust within the drilling-dust grooves, the transporting direction being oriented in the direction of the clamping end 6.

The present invention may also be realized in that, instead of discharge-groove sections within an existing discharge groove, provision is made for a plurality of spiral-like discharge grooves, although in this case the respective discharge-groove-bounding webs are provided with different external diameters. For example, in the case of a 2-spiral or 4-spiral conveying helix, the external diameter of every second web may be of smaller design, as a result of which the reduced external diameter results in reduced wall friction. This variation in the external diameter of the webs may take place symmetrically or asymmetrically over the length of the conveying helix. It may also be carried out as desired on a web itself, i.e. a web may have alternately, for example over an angle of rotation of n×360° (for n=1, 2, 3), a larger or smaller external diameter. This constantly reduces the wall friction, while the conveying properties of the conveying helix remain virtually the same.

The invention is not restricted to the exemplary embodiments which have been illustrated and described. Rather, it also covers all other modifications familiar to those skilled in the art within the context of the claims.

What is claimed is:

1. A rock-drilling tool for rotary and percussive operation, comprising:
   a drill head;
   a clamping shank; and
   a single-start or multi-start conveying helix, which adjoins the drill head and the clamping shank, the conveying helix having a discharge groove for drilling dust, a spirally-running main web, and a secondary web, wherein the discharge groove is bounded by the spirally-running main web and the secondary web is provided in the discharge groove and has a different external diameter than the main web at least over part of a length of the conveying helix and over part of a periphery of the conveying helix, wherein the spirally running main web includes a drilling-dust carrying surface and the secondary web includes at least one additional drilling-dust-carrying surface.

2. The drilling tool of claim 1, wherein the conveying helix includes a plurality of discharge grooves bounded by a plurality of main webs having different external diameters.

3. The drilling tool of claim 1, wherein the conveying helix is a two-spiral helix or four-spiral helix, and includes a plurality of main webs bounding respective discharge grooves have alternating different external diameters and different web-spine widths.

4. The drilling tool of claim 1, wherein the conveying helix is subdivided into a plurality of discharge-groove sections.

5. The drilling tool of claim 1, wherein the external diameter of the secondary web is set back in relation to the diameter of the main web, and the external diameter of the secondary web is approximately 70 to 90% of the external diameter of the main web.

6. The drilling tool of claim 1, wherein the spine width of the secondary web is smaller than the spine width of the main web.

7. The drilling tool of claim 1, wherein the drilling-dust-carrying surfaces of the main web and the secondary web have an approximately right-angled profile in relation to a longitudinal axis of the drill.

8. The drilling tool of claim 1, wherein the drilling-dust-carrying surfaces of the main web and the secondary web have a planar, convex or pocket-like profile.

9. The drilling tool of claim 1, wherein a cross section of the main web and of the secondary web are of rectangular, trapezoidal, semitrapezoidal, triangular or semicircular design an terminate with a pointor flat or round formation.

10. The drilling tool of claim 1, wherein the discharge groove has discharge-groove sections and the discharge-groove sections have depths wherein a discharge-groove section located on one side of the secondary web has a different depth than the discharge-groove sections on the other side of the secondary web.

11. The drilling tool of claim 1, wherein at least two webs of the single-spiral or multi-spiral conveying helix have a different external diameter and different spine-width in the periphery of the conveying helix.

12. A rock-drilling tool for rotary and percussive operation, comprising:

a drill head;

a single-start or multi-start spiral conveying helix, which adjoins the drill head and has at least one discharge groove for drilling dust; and a clamping shank, wherein the discharge groove of the conveying helix is bounded by a spirally running main web and is subdivided into two or more discharge-groove sections, each section having a drilling-dust-carrying surface, and wherein between the spirally running main web is at least one additional secondary web having a drilling-dust-carrying surface, said main web and said secondary web having different external diameters at least over part of a length of the conveying helix and over part of a periphery of the conveying helix.

13. The drilling tool of claim 12, wherein the drilling-dust-carrying surfaces of the main web and the secondary web have an approximately right-angled profile in relation to a longitudinal axis of the drill.

14. The drilling tool of claim 12, wherein the drilling-dust-carrying surfaces of the main web and the secondary web have a planar, convex or pocket-like profile.

* * * * *